Patented June 6, 1950

2,510,902

UNITED STATES PATENT OFFICE 2,510,902

COPOLYMERS AND METHOD OF PREPARATION

Stearns T. Putnam, Newark, Del., assignor to Hercules Powder Company, Wilmington, Del., a corporation of Delaware No Drawing. Application May 18, 1946, Serial No. 670,840

8 Claims. (Cl. 260—78.5)

This invention relates to new polymeric materials and more particularly to copolymers of 10-hendecenoic acid with moleic anhydride and the process of producing these copolymers.

It is well known that according to the Diels-Alder reaction maleic anhydride may be condensed with conjugated unsaturated compounds such as butadiene, alpha-terpinene, etc., and with drying oils of the tung oil type which contain conjugated double bonds. Maleic anhydride has also been reacted with unsaturated compounds, which do not contain a conjugated system of double bonds such as with drying oils of the linseed oil, soya bean oil, etc., types and with unsaturated higher fatty acids such as linoleic acid, etc., to form adducts. This reaction which takes place either at a high temperature and/or in the presence of catalysts is believed to occur by the double bonds shifting under these conditions to conjugated systems with which the maleic anhydride then reacts in the normal diene reaction. In the past the only compounds with which maleic anhydride would react to form polymers were those compounds which would themselves readily polymerize as, for example, vinyl compounds such as styrene, vinyl acetate, vinyl chloride, acolein, etc., or compounds which more difficultly polymerize themselves such as the lower olefins, ethylene, propylene, isobutylene, and butene-1.

Now in accordance with this invention it has been found that maleic acid anhydride or dialkyl esters of maleic acid may be copolymerized, in the presence of a peroxide catalyst, with a compound having the formula

where X may be —COOR, —COR, —CONRR', or —CN and R and R' may be hydrogen or an alkyl radical containing not more than five carbon atoms. The products formed by this reaction have high molecular weights and contain approximately three carboxyl groups, or derivatives thereof, per copolymer unit. This reaction of maleic anhydride with 10-hendecenoic acid to form polymers is unique with 10-hendecenoic acid since this acid itself will not polymerize in the presence of a peroxide catalyst and also since such closely related acids as oleic and the linseed fatty acids, which at high temperatures will form condensates with maleic anhydride, fail to yield to any appreciable degree a polymeric material with maleic anhydride in the presence of a peroxide.

The following examples are illustrative of the new products and the process for producing them. All parts and percentages are by weight unless otherwise indicated.

Example I 10-hendecenoic acid (92 parts) and maleic anhydride (49 parts) were dissolved in 100 parts of thiophene-free benzene and 2.8 parts of benzoyl peroxide were added. The mixture was heated on the steam bath under reflux with agitation for about 6 hours. The reaction mixture which separated into 2 phases was allowed to stand over night and then was poured into 1000 parts of hexane. The viscous semisolid product was separated by decantation and filtration and washed with hexane. The crude product was dissolved in 100 parts of acetone and this solution was added dropwise to 2000 parts of hexane with stirring. The product was separated, washed with hexane and dried to give 91.5 parts of light tan powdery copolymer. The copolymer was purified by repeating the solution in acetone and precipitation in hexane 4 times and then finally dried in vacuo at room temperature. The purified copolymer had an acid number of 502, saponification number (DEG) 526, molecular weight (Rast) 856, bromine number of 2, and a melting point of 100–140° C.

Example II 10-hendecenoic acid (92 parts) and dimethyl maleate (72 parts) were dissolved in 100 parts of purified benzene and 2.8 parts of benzoyl peroxide were added. The mixture was agitated and refluxed for 6 hours at a liquid temperature of 93–95° C. The reaction mixture was then poured into 2000 parts of hexane while stirring vigorously and the insoluble gummy material was recovered as described in the foregoing example. The yield of copolymer which was obtained amounted to 28.3 parts.

Example III

Methyl 10-hendecenoate (98 parts) and maleic anhydride (49 parts) were dissolved in 100 parts of purified benzene and 2.8 parts of benzoyl peroxide were added. The mixture was heated on the steam bath under reflux with agitation for 6 hours. The reaction mixture was then poured into 1000 parts of hexane and the viscous product was recovered as described in Example I.

The 10-hendecenoic acid, which is also commonly referred to as undecylenic acid, may be obtained by the cracking of ricinoleic acid or its salts or esters.

The 10-hendecenoic acid and the maleic anhydride may be copolymerized by heating in an inert solvent in the presence of a peroxide catalyst. Any solvent which is inert to maleic anhydride and which is anhydrous, in order to prevent hydrolysis of the anhydride, may be used. Particularly suitable are such solvents as benzene, toluene, xylene, dioxane, and acetone. The reaction is usually carried out at the reflux temperature of the solvent, for example, with benzene as the solvent, the temperature is usually about 80–95° C. However, the temperature of the reaction may range from about 50° C. to about 150° C. At temperatures above this point the formation of the monomeric condensate of maleic anhydride and hendecenoic acid will interfere with the copolymerization reaction.

The copolymerization reaction in accordance with this invention may be carried out in the presence of any peroxide catalyst. Any peroxide which is soluble in the reaction mixture is satisfactory for this purpose. Suitable peroxides which may be used include benzoyl peroxide, acetyl peroxide, butyryl peroxide, lauroyl peroxide, succinyl peroxide, ascaridole, etc. The peroxide catalyst may be added at the beginning of the reaction or it may be added in small portions throughout the course of the reaction. Usually the peroxide is used in amount corresponding to about 2% by weight of the reactants. However, the amount of catalyst may vary from about 0.5% to about 10% without affecting the results of the reaction.

The copolymerization of 10-hendecenoic acid may be carried out with maleic anhydride or with the dialkyl esters of maleic acid such as dimethyl maleate, etc. However, for the highest yields of copolymer, maleic anhydride is preferred. The halogen derivatives, such as chloromaleic anhydride, may also be used for this reaction.

The 10-hendecenoic acid may be used as such in carrying out the copolymerization reaction or its esters such as the methyl, ethyl, butyl, or amyl, esters may be used without affecting the copolymerization. Other derivatives of 10-hendecenoic acid which are operable in this copolymerization reaction are its aldehyde, nitrile, amides, and ketones or any other modifications of the carboxyl group which do not react with maleic anhydride. Thus, any compound having the formula $$CH_2=CH-(CH_2)_7-CH_2-X$$

where X may be —COOR, —COR, —CONRR', or —CN and R and R' may be hydrogen or an alkyl radical containing not more than five carbon atoms, may be used in this copolymerization reaction.

The copolymer of 10-hendecenoic acid and maleic anhydride is a light tan powder melting at 110–140° C. It is soluble in acetone and insoluble in benzene and hexane, and has an average molecular weight (Rast) of over 800. It may be dissolved in dilute alkali in which case it forms soapy solutions. In the foregoing examples the two reactants have been employed in equimolar amounts. If desired, an excess of the 10-hendecenoic acid could be used to obtain a product containing a higher ratio of hendecenoic acid to maleic anhydride.

The copolymers of 10-hendecenoic acid and maleic anhydride contain approximately 3 carboxylic groups per copolymer unit and, therefore, may be used to prepare polyesters and polyamides. The polymers of 10-henecenoic acid and maleic anhydride being soluble in dilute alkali may also be used as size additives and as textile finishing agents. In addition, the new products of this invention may be used as tanning agents, photographic chemicals, gelatin substitutes, protein hardeners, etc.

What I claim and desire to protect by Letters Patent is:

1. A copolymer of a compound selected from the group consisting of maleic acid anhydride, chloromaleic anhydride and dimethyl maleate and a compound having the formula $$CH_2=CH-(CH_2)_7-CH_2-X$$

where X is selected from the group consisting of —COOR, —COR, —CONRR', and —CN and R and R' are selected from the group consisting of hydrogen and an alkyl radical containing not more than five carbon atoms, said copolymer containing one molecule of the first-mentioned compound and one molecule of the second-mentioned compound per copolymer unit.

2. The process which comprises heating at a temperature of from about 50° C. to about 150° C. in the presence of a peroxide catalyst, a compound selected from the group consisting of maleic acid anhydride, chloromaleic anhydride and dimethyl maleate, and a compound having the formula $$CH_2=CH-(CH_2)_7-CH_2-X$$

where X is selected from the group consisting of —COOR, —COR, —CONRR', and —CN and R and R' are selected from the group consisting of hydrogen and an alkyl radical containing less than five carbon atoms, to provide a copolymer having one molecule of the first-mentioned compound and one molecule of the second-mentioned compound per copolymer unit.

3. The process which comprises heating 10-hendecenoic acid with maleic acid anhydride at a temperature of from about 50° C. to about 150° C. in the presence of a peroxide catalyst to provide a copolymer containing one molecule of 10-hendecenoic acid and one molecule of maleic acid anhydride per copolymer unit.

4. The process which comprises heating 10-hendecenoic acid with dimethyl maleate at a temperature of from about 50° C. to about 150° C. in the presence of a peroxide catalyst to provide a copolymer which contains one molecule of 10-hendecenoic acid and one molecule of dimethyl maleate per copolymer unit.

5. The process which comprises heating an alkyl ester of 10-hendecenoic acid, in which the alkyl radical contains not more than five carbon atoms, with maleic acid anhydride at a temperature of from about 50° C. to about 150° C. in the presence of a peroxide catalyst to provide a copolymer containing one molecule of the alkyl ester of 10-hendecenoic acid and one molecule of maleic acid anhydride per copolymer unit.

6. A copolymer of 10-hendecenoic acid and maleic acid anhydride, said copolymer containing one molecule of 10-hendecenoic acid and one molecule of maleic acid anhydride per copolymer unit.

7. A copolymer of 10-hendecenoic acid and dimethyl maleate, said copolymer containing one molecule of 10-hendecenoic acid and one molecule of dimethyl maleate per copolymer unit.

8. A copolymer of an ester of 10-hendecenoic acid and maleic acid anhydride, said ester of 10-hendecenoic acid being the ester of said acid and an alkanol of not more than 5 carbon atoms, said copolymer containing one molecule of the ester of 10-hendecenoic acid and one molecule of maleic acid anhydride per copolymer unit.

STEARNS T. PUTNAM.

REFERENCES CITED

The following references are of record in the file of this patent:

UNITED STATES PATENTS

| Number | Name | Date |
| --- | --- | --- |
| 1,188,882 | Clocker | June 30, 1940 |

Certificate of Correction

Patent No. 2,510,902

June 6, 1950

STEARNS T. PUTNAM

It is hereby certified that errors appear in the printed specification of the above numbered patent requiring correction as follows:

Column 1, line 3, for "moleic" read *maleic*; line 27, for "acolein" read *acrolein*; column 3, line 16, for the word "amount" read *amounts*; line 63, for "10-henecenoic" read *10-hendecenoic*; column 4, line 75, reference cited, for the patent number "1,188,882" read *2,188,882*;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*